United States Patent
Glugla et al.

(10) Patent No.: US 9,145,823 B2
(45) Date of Patent: *Sep. 29, 2015

(54) METHOD FOR PURGING CONDENSATE FROM A CHARGE AIR COOLER

(71) Applicant: Ford Global Technologies, LLC, Dearborn, MI (US)

(72) Inventors: Chris Paul Glugla, Macomb, MI (US); Adam Nathan Banker, Plymouth, MI (US); Qiuping Qu, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

This patent is subject to a terminal disclaimer.

(21) Appl. No.: 13/656,511

(22) Filed: Oct. 19, 2012

(65) Prior Publication Data

US 2014/0109568 A1    Apr. 24, 2014

(51) Int. Cl.
*F02B 33/44* (2006.01)
*F02B 33/00* (2006.01)
(Continued)

(52) U.S. Cl.
CPC ........ *F02B 29/0406* (2013.01); *F02D 13/0219* (2013.01); *F02D 37/02* (2013.01); *F02D 41/0002* (2013.01); *F02D 41/0007* (2013.01); *F02D 41/10* (2013.01); *F02M 35/088* (2013.01); *F02P 5/045* (2013.01); *F02B 2075/125* (2013.01); *F02D 13/0265* (2013.01); *F02D 41/0055* (2013.01); *F02D 2041/001* (2013.01); *F02D 2200/04* (2013.01); *F02D 2200/0402* (2013.01); *F02D 2200/0406* (2013.01);

(Continued)

(58) Field of Classification Search
CPC ...... F02B 33/44; F02B 29/04; F02B 2029/04; F02B 2075/125; F02B 37/18; F24F 1/42; F24F 1/44; F24F 2011/0054; Y02T 10/144
USPC .............................. 60/605.1, 605.2; 123/563; 701/103–104, 108
IPC ....................................................... F02M 25/07
See application file for complete search history.

(56) References Cited

U.S. PATENT DOCUMENTS 5,949,146 A * 9/1999 VandenBerghe .............. 123/350
6,301,887 B1  10/2001 Gorel et al.
(Continued)

FOREIGN PATENT DOCUMENTS

EP    1391677 A2 *  2/2004  .............. F02B 29/04
EP    1918546 A1    5/2008
(Continued)

OTHER PUBLICATIONS

Glugla, Chris Paul et al., "Engine Control System and Method," U.S. Appl. No. 13/648,784, filed Oct. 10, 2012, 47 pages.
(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

Methods and systems are provided for performing a proactive condensate clean-out of a charge air cooler. In response to condensate in a charge air cooler and engine operating conditions, airflow is increased to the intake manifold, purging condensate from the cooler. Engine actuators may also be adjusted to maintain torque demand during the clean-out procedure.

20 Claims, 10 Drawing Sheets

(51) Int. Cl.
*F02M 25/07* (2006.01)
*F02B 29/04* (2006.01)
*F02M 35/08* (2006.01)
*F02D 13/02* (2006.01)
*F02D 41/10* (2006.01)
*F02P 5/04* (2006.01)
*F02D 37/02* (2006.01)
*F02D 41/00* (2006.01)
*F02B 75/12* (2006.01)

(52) U.S. Cl.
CPC . *F02D2200/0414* (2013.01); *F02D 2200/0418* (2013.01); *F02M 25/0707* (2013.01); *Y02T 10/144* (2013.01); *Y02T 10/146* (2013.01); *Y02T 10/18* (2013.01); *Y02T 10/42* (2013.01)

(56) References Cited

U.S. PATENT DOCUMENTS

| | | | |
|---|---|---|---|
| 6,367,256 B1 | 4/2002 | McKee | |
| 6,408,831 B1 | 6/2002 | Craig et al. | |
| 6,681,171 B2 | 1/2004 | Rimnac et al. | |
| 6,880,518 B2* | 4/2005 | Shiraishi et al. | 123/305 |
| 7,146,800 B2* | 12/2006 | Toshioka et al. | 60/285 |
| 7,424,868 B2 | 9/2008 | Reckels et al. | |
| 7,533,651 B2 | 5/2009 | Surnilla | |
| 7,707,991 B2 | 5/2010 | Miyanaga et al. | |
| 7,886,724 B2 | 2/2011 | Tai et al. | |
| 7,980,076 B2* | 7/2011 | Buia et al. | 60/599 |
| 8,015,808 B2* | 9/2011 | Keefer et al. | 60/517 |
| 8,020,536 B2 | 9/2011 | Kardos | |
| 2003/0217733 A1 | 11/2003 | Shiraishi et al. | |
| 2005/0279093 A1* | 12/2005 | Wang et al. | 60/599 |
| 2006/0095178 A1 | 5/2006 | Guilfoyle et al. | |
| 2007/0277792 A1* | 12/2007 | Durand | 123/563 |
| 2010/0078001 A1 | 4/2010 | Kolmanovsky et al. | |
| 2010/0332075 A1* | 12/2010 | Clarke et al. | 701/35 |
| 2011/0053735 A1 | 3/2011 | Lewis et al. | |
| 2011/0094219 A1 | 4/2011 | Palm | |
| 2011/0094482 A1 | 4/2011 | Weber et al. | |
| 2011/0137530 A1 | 6/2011 | Kerns | |
| 2011/0155112 A1* | 6/2011 | Schiestl et al. | 123/672 |
| 2011/0246023 A1 | 10/2011 | Lockwood et al. | |
| 2011/0303187 A1 | 12/2011 | Sasaki | |
| 2012/0158228 A1 | 6/2012 | Biondo et al. | |
| 2013/0019845 A1* | 1/2013 | Meyer | 123/542 |
| 2014/0041381 A1* | 2/2014 | Kuske et al. | 60/602 |
| 2014/0047833 A1* | 2/2014 | Buckland et al. | 60/599 |
| 2014/0048048 A1* | 2/2014 | Glugla et al. | 123/542 |
| 2014/0048049 A1* | 2/2014 | Glugla et al. | 123/563 |
| 2014/0060500 A1* | 3/2014 | Cockerill | 123/542 |
| 2014/0075976 A1* | 3/2014 | Glugla et al. | 62/150 |
| 2014/0076289 A1* | 3/2014 | Ruona et al. | 123/542 |
| 2014/0100074 A1* | 4/2014 | Glugla | 477/3 |
| 2014/0100758 A1* | 4/2014 | Glugla et al. | 701/103 |
| 2014/0216367 A1* | 8/2014 | Norman et al. | 123/41.02 |
| 2014/0290630 A1* | 10/2014 | Pursifull | 123/564 |
| 2014/0328665 A1* | 11/2014 | Glugla et al. | 415/1 |
| 2014/0352661 A1* | 12/2014 | Glugla et al. | 123/406.19 |
| 2014/0352663 A1* | 12/2014 | Glugla et al. | 123/443 |
| 2014/0352979 A1* | 12/2014 | Habesland | 166/380 |
| 2015/0135705 A1* | 5/2015 | Pursifull | F02B 29/0431 |

FOREIGN PATENT DOCUMENTS

| | | | | |
|---|---|---|---|---|
| JP | 2008196368 A | * | 8/2008 | F02B 37/00 |
| WO | 9219851 A2 | | 11/1992 | |
| WO | 2007126372 A1 | | 11/2007 | |
| WO | 2010090866 A2 | | 8/2010 | |

OTHER PUBLICATIONS

Glugla, Chris Paul, "Charge Air Cooler Condensation Control," U.S. Appl. No. 13/621,696, filed Sep. 17, 2012, 33 pages.

Glugla, Chris Paul, "Charge Air Cooler Condensate Purging Cycle," U.S. Appl. No. 13/658,854, filed Oct. 10, 2012, 62 pages.

Glugla, Chris Paul et al., "Condensation Control in a Charge Air Cooler by Controllling Charge Air Cooler Temperature," U.S. Appl. No. 13/664,248, filed Oct. 30, 2012, 49 pages.

Styles, Daniel Joseph et al., "Charge Air Cooler (CAC) Corrosion Reduction Utilizing Grille Shutters," U.S. Appl. No. 13/656,524, filed Oct. 19, 2012, 33 pages.

Surnilla, Gopichandra et al., "Engine Control Coordination with Grille Shutter Adjustment and Ambient Conditions," U.S. Appl. No. 13/656,542, filed Oct. 19, 2012, 33 pages.

Glugla, Chris Paul et al., "Engine Control System and Method," U.S. Appl. No. 13/656,560, filed Oct. 19, 2012, 50 pages.

Glugla, Chris Paul et al., "Engine Control System and Method," U.S. Appl. No. 13/656,567, filed Oct. 19, 2012, 49 pages.

Styles, Daniel Joseph et al., "Engine Cooling Fan to Reduce Charge Air Cooler Corrosion," U.S. Appl. No. 13/656,471, filed Oct. 19, 2012, 44 pages.

* cited by examiner

METHOD FOR PURGING CONDENSATE FROM A CHARGE AIR COOLER

BACKGROUND/SUMMARY

Turbocharged and supercharged engines may be configured to compress ambient air entering the engine in order to increase power. Compression of the air may cause an increase in air temperature, thus, a charge air cooler may be utilized to cool the heated air thereby increasing its density and further increasing the potential power of the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. When torque is increased, such as during acceleration, increased mass air flow may strip the condensate from the CAC, drawing it into the engine and increasing the likelihood of engine misfire.

Other attempts to address engine misfire due to condensate ingestion involve avoiding condensate build-up. However, the inventors herein have recognized potential issues with such methods. Specifically, while some methods may reduce or slow condensate formation in the CAC, condensate may still build up over time. If this build-up cannot be stopped, ingestion of the condensate during acceleration may cause engine misfire. Another method to prevent engine misfire due to condensate ingestion includes trapping and/or draining the condensate from the CAC. While this may reduce condensate levels in the CAC, condensate is moved to an alternate location or reservoir, which may be subject to other condensate problems such as freezing and corrosion.

In one example, the issues described above may be addressed by a method for periodically purging the condensate from the CAC during safe vehicle operating conditions. A CAC clean-out cycle may be initiated in response to a condensate level if operating requirements for stable combustion are fulfilled. By increasing airflow through the CAC, controlled amounts of condensate may be blown off into the engine without causing misfire. The increase in engine airflow may be counteracted by adjusting various engine actuators to maintain torque demand. In this way, the clean-out cycle may not alert the vehicle operator. By performing this clean-out routine, condensate levels in the CAC may be maintained at a low level to prevent engine misfire during normal vehicle operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 11 shows a graphical example for adjusting spark timing in response to purging condensate from a CAC during a tip-in.

DETAILED DESCRIPTION

Figure 1:
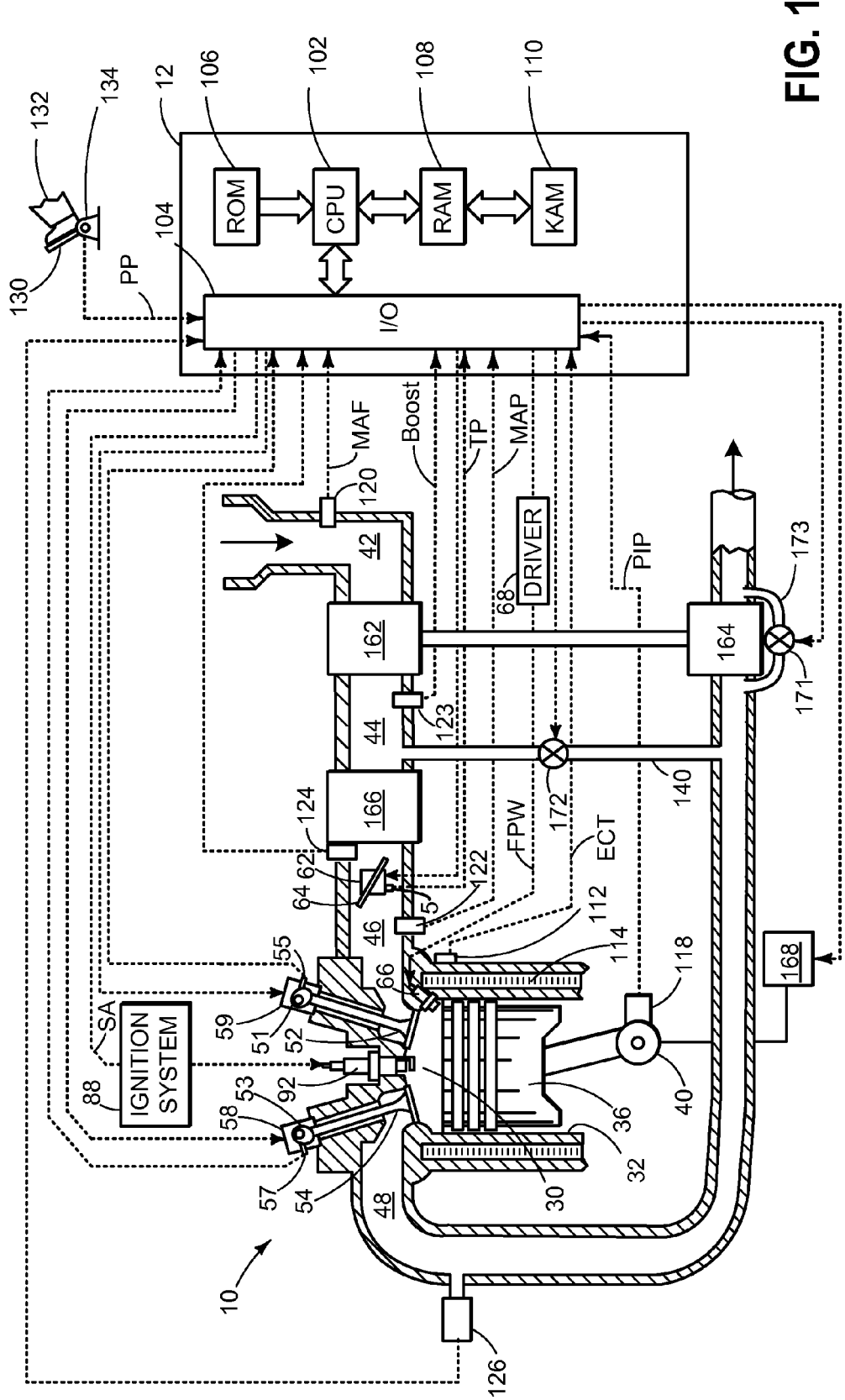
FIG. 1 is a schematic diagram of an example engine system including a charge air cooler.
Figure 11:
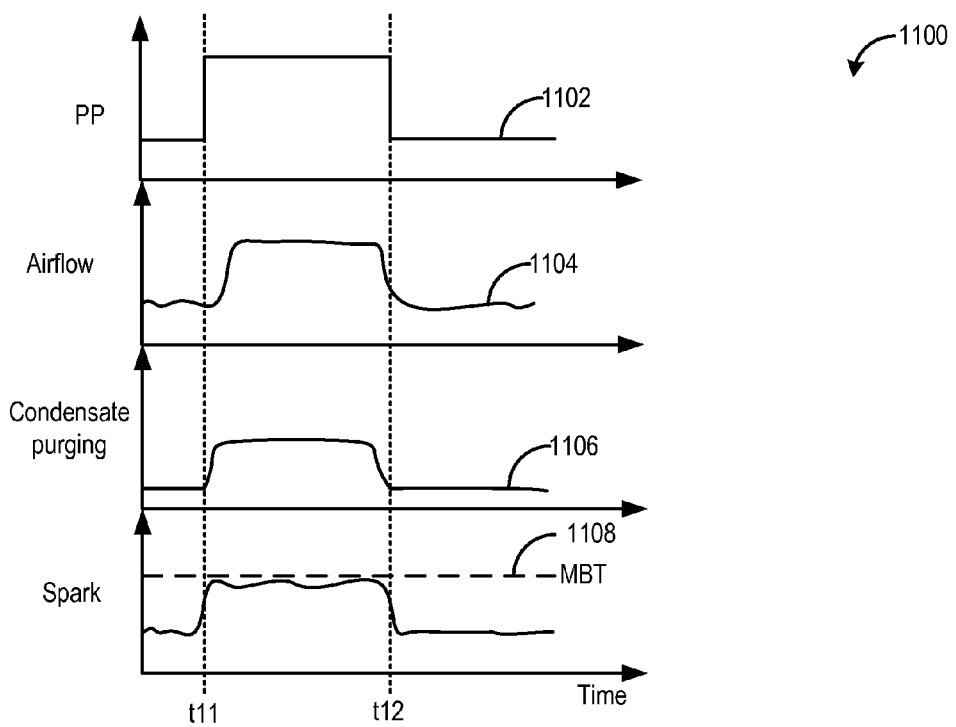

The following description relates to systems and methods for purging condensate from a charge air cooler (CAC) to an engine system, such as the system of FIG. 1, while also adjusting engine actuators, including spark timing, in response to condensate flow. CAC condensate purging may occur in response to driver-initiated input such as a tip-in condition. Alternatively, a pro-active condensate clean-out of the CAC may be performed in response to condensate level and other system variables. In both purge situations, engine actuators may be adjusted to maintain torque and improve engine performance. An engine controller may be configured to perform a control routine, such as the routine of FIG. 2, to estimate a condensate level in the CAC, and respond to a tip-in condensate clean-out or perform a pro-active condensate clean-out while adjusting ignition spark timing accordingly. The controller may infer the amount of condensate in the CAC based on a model presented in FIG. 3. A pro-active clean out routine (FIG. 5) wherein airflow through the CAC is pro-actively increased to purge condensate may be performed if conditions are present to enable a pro-active CAC clean-out routine (FIG. 4). Alternatively, the purging may happen during a tip-in because of the increased air flow. Engine torque may be maintained during the purging by adjusting a series of engine controls. Example adjustments and purging operations are presented at FIGS. 7-8. These examples highlight the controls which may be required to trigger and perform a CAC clean-out cycle. Spark timing may also be adjusted by the controller based on changes in intake manifold humidity, determined in part by condensate level in the CAC, elaborated at FIG. 6. Example adjustments to borderline knock limit and spark timings based on humidity and CAC condensate levels is presented at FIG. 9. Example purging operations with concomitant adjustments to spark timing are shown at FIGS. 11-12.

Referring now to FIG. 1, internal combustion engine 10, comprising a plurality of cylinders, one cylinder of which is shown in FIG. 1, is controlled by electronic engine controller 12. Engine 10 includes combustion chamber (cylinder) 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57. In this way, controller 12 may control the cam timing through phasers 58 and 59. Variable cam timing (VCT) may be either advanced or retarded, depending on various factors such as engine load and engine speed (RPM).

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system is used to generate higher fuel pressures. In addition, intake manifold 46 is shown communicating with optional electronic throttle 62 which adjusts a position of throttle plate 64 to control air flow from intake boost chamber 44. Compressor 162 draws air from air intake 42 to supply intake boost chamber 44. Exhaust gases spin turbine 164 which is coupled to compressor 162 which compresses air in boost chamber 44. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Turbocharger waste gate 171 is a valve that allows exhaust gases to bypass turbine 164 via bypass passage 173 when turbocharger waste gate 171 is in an open state. Substantially all exhaust gas passes through turbine 164 when waste gate 171 is in a fully closed position.

Further, in the disclosed embodiments, an exhaust gas recirculation (EGR) system may route a desired portion of exhaust gas from exhaust manifold 48 to intake boost chamber 44 via EGR passage 140. The amount of EGR provided to intake boost chamber 44 may be varied by controller 12 via EGR valve 172. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below. Specifically, EGR contains a large amount of water as it is a combustion by-product. Since EGR is at a relatively high temperature and contains a lot of water, the dew-point temperature may also be relatively high. Consequently, condensate formation from EGR can even be much higher than condensate formation from compressing air and lowering it to the dew-point temperature.

Intake boost chamber 44 may further include charge air cooler (CAC) 166 (e.g., an intercooler) to decrease the temperature of the turbocharged or supercharged intake gases. In some embodiments, CAC 166 may be an air to air heat exchanger. In other embodiments, CAC 166 may be an air to liquid heat exchanger. CAC 166 may include a valve to selectively modulate the flow velocity of intake air traveling through the charge air cooler 166 in response to condensation formation within the charge air cooler.

Hot charge air from the compressor 162 enters the inlet of the CAC 166, cools as it travels through the CAC 166, and then exits to pass though the throttle 62 and into the engine intake manifold 46. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC, and then be purged into the engine during selected engine operating conditions, such as during acceleration events. However, if the condensate is introduced at once into the engine during an acceleration event, there may be an increase in the chance of engine misfire or combustion instability (in the form of late/slow burns) due to the ingestion of water. Thus, as elaborated herein with reference to FIGS. 2-5, condensate may be purged from the CAC to the engine under controlled conditions. This controlled purging may help to reduce the likelihood of engine misfire events. In one example, condensate may be purged from the CAC using increased airflow during a tip-in condition. In another example, condensate may be pro-actively purged from the CAC by increasing airflow to the engine intake while controlling engine actuators to maintain torque demand.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164. Alternatively, a two-state exhaust gas oxygen sensor may be substituted for UEGO sensor 126.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. During the expansion stroke, the expanding gases push piston 36 back to BDC. Crankshaft 40 converts piston movement into a rotational torque of the rotary shaft. Crankshaft 40 may be used to drive alternator 168. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 is shown in FIG. 1 as a conventional microcomputer including: microprocessor unit 102, input/output ports 104, an electronic storage medium for executable programs and calibration values shown as read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a pedal position sensor 134 coupled to an accelerator pedal 130 for sensing force applied by vehicle operator 132; a measurement of engine manifold absolute pressure (MAP) from pressure sensor 122 coupled to intake manifold 46; a measurement of boost pressure (Boost) from pressure sensor 123; a measurement of inducted mass air flow (MAF) from mass air flow sensor 120; a measurement of throttle position (TP) from a sensor 5; and temperature at the outlet of a charge air cooler 166 from a temperature sensor 124. Barometric pressure may also be sensed (sensor not shown) for processing by controller 12. In a preferred aspect of the present description, engine position sensor 118 produces a profile ignition pickup signal (PIP). This produces a predetermined number of equally spaced pulses every revolution of the crankshaft from which engine speed (RPM) can be determined. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. Other sensors not depicted may also be present, such as a sensor for determining the intake air velocity at the inlet of the charge air cooler, and other sensors.

Furthermore, controller 12 may communicate with various actuators, which may include engine actuators such as fuel injectors, an electronically controlled intake air throttle plate, spark plugs, camshafts, etc. Various engine actuators may be controlled to provide or maintain torque demand as specified by the vehicle operator 132. These actuators may adjust certain engine control parameters including: variable cam timing (VCT), the air-to-fuel ratio (AFR), alternator loading, spark timing, throttle position, etc. For example, when an increase in PP is indicated (e.g., during a tip-in) from pedal position sensor 134, torque demand is increased.

In response to a tip-in, controller 12 may increase the opening of throttle 62, increasing the intake airflow. As elaborated herein at FIGS. 2 and 11, the increased airflow available during a tip-in may be advantageously used to purge condensate from a CAC to an engine intake. Spark timing adjustments may be simultaneously used to maintain torque via combustion phasing during the purging.

In some embodiments, an increase in mass air flow may be triggered by systems other than the vehicle operator, such as in response to a condensate level in the CAC. For example, purging of condensate from the CAC may be indicated, requiring an increase in mass air flow through the CAC. In this case, engine torque may need to remain unchanged despite the increase in airflow. Herein, the engine actuators may be adjusted to maintain the requested torque demand. For example, by retarding or advancing spark timing in relation to MBT, torque may be decreased to compensate for the (proactive) increase in airflow during the clean-out routine. In another example, retarding or advancing VCT may be used to decrease torque during the pro-active clean-out routine. In some embodiments, adjusting the AFR leaner or richer than RBT (rich for best torque) may reduce power output at the larger throttle opening, helping to maintain torque demand. Further still, increasing alternator loading may provide torque compensation. Vehicles with electric machines (e.g., hybrid vehicles) may be able to increase alternator to a greater degree as they may have a larger operating range.

Returning to FIG. 1, in some examples, storage medium read-only memory 106 may be programmed with computer readable data representing instructions executable by microprocessor unit 102 for performing the methods described below as well as other variants that are anticipated but not specifically listed. Example methods are described herein with reference to FIGS. 2-6.

Figure 2:
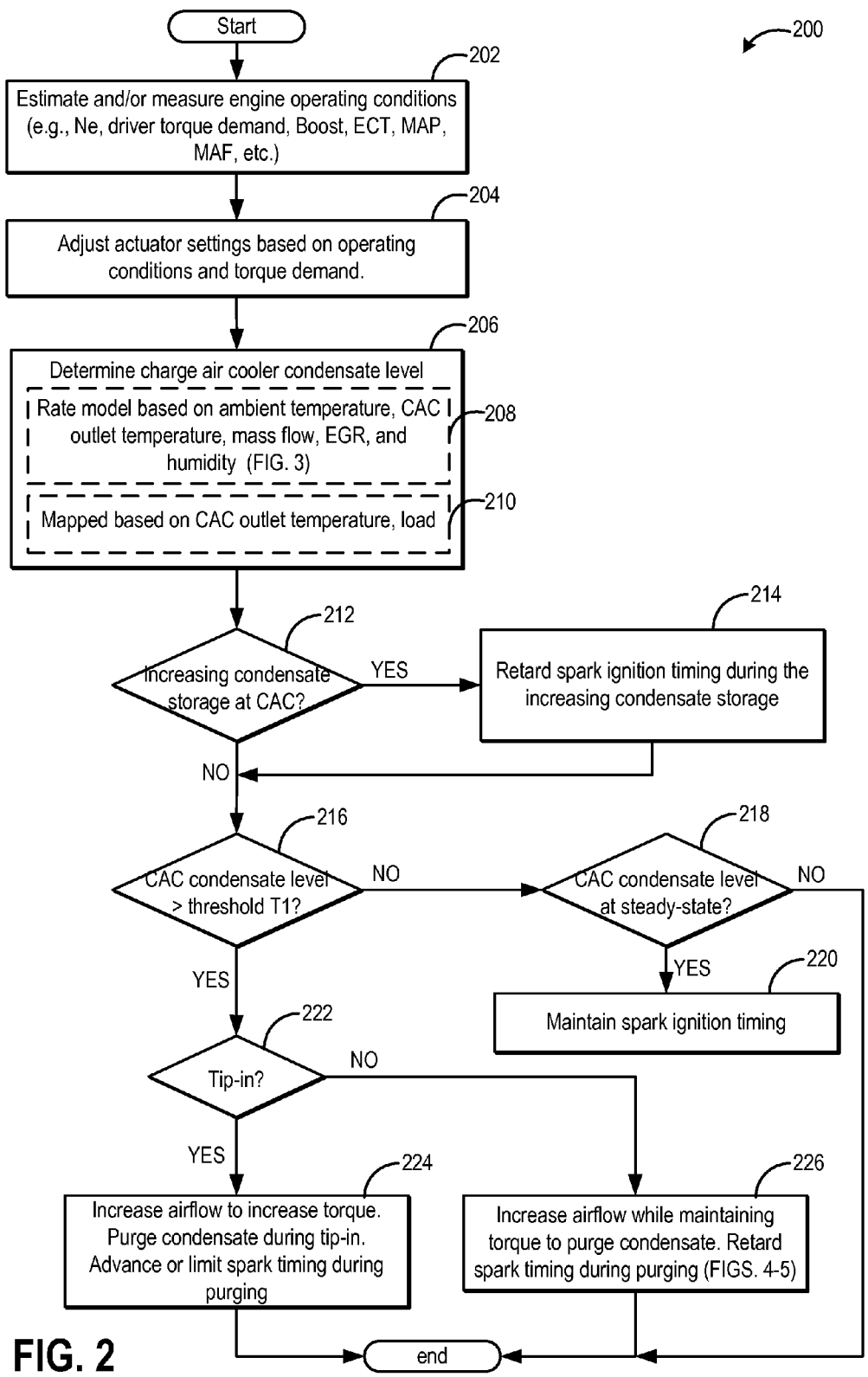
FIG. 2 shows a high level flow chart of a method for purging condensate from a charge air cooler (CAC) based on operating conditions and condensate level.

Turning to FIG. 2, an example method 200 for purging condensate from a CAC during a tip-in or a pro-active condensate clean-out routine, while maintaining a desired torque level, is depicted. The selection may be based on vehicle operating conditions and a CAC condensate level. By performing a clean out routine during a tip-in, the increased air flow at the tip-in can be used to purge condensate. During other conditions, air flow can be actively increased to enable purging to be completed.

At 202, method 200 includes estimating and/or measuring engine operating conditions. These may include driver torque demand (based on a pedal position), engine speed (Ne) and load, ECT, boost, ambient temperature, MAF, MAP, EGR amount, air-fuel ratio (A/F), ambient humidity, ambient pressure, BP, engine temperature, exhaust catalyst temperature, CAC conditions (inlet and outlet temperature, inlet and outlet pressure, flow rate through the CAC, etc.) and other parameters. At 204, the routine adjusts one or more engine actuator settings based on engine operating conditions and torque demand. The actuator settings adjusted may include, for example, variable cam timing (VCT), AFR, throttle opening, spark timing, etc.

At 206, method 200 includes determining the condensate level in the CAC. This may include retrieving details such as ambient air temperature, ambient air humidity, inlet and outlet charge air temperature, and inlet and outlet charge air pressure from a plurality of sensors and using the variables to determine the amount of condensate formed in the CAC. In one example, at 208, condensate levels at the CAC are based on a model (elaborated at FIG. 3) that computes the rate of condensate formation within the CAC based on ambient temperature, CAC outlet temperature, mass flow, EGR, humidity, etc. In another example, at 210, a condensation formation value is mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. In one example, the map may include a modifier of ambient temperature. In another example, a pressure ratio of the CAC to the ambient pressure may be used to estimate condensation formation. Therein, engine load may be normalized and estimated in the intake manifold (behind the throttle) so it might be a lower pressure than in the CAC.

At 212, method 200 determines whether condensate storage is increasing in the CAC. That is, it may be determined if an amount of condensate (or condensate level) at the CAC is increasing over time. If condensate storage is increasing, the routine includes retarding spark ignition during increased condensate storage at 214, in order to control knock. Method 200 continues on from both 212 and 214 to determine at 216 if the CAC condensate level is above a threshold value, T1. The threshold value T1 may reflect an amount of condensate above which ingestion by the engine may cause misfire events. If the CAC condensate level is not above threshold value T1, the routine determines at 218 if the CAC condensate level is at a steady-state condition (e.g., condensate level not increasing or decreasing). If the CAC condensate level is at steady-state, the routine maintains spark timing at MBT at 220. If the CAC condensate level is not at steady-state, the routine ends.

Returning to 216, if the condensate level is above threshold value T1, the routine determines at 222 if there is a tip-in condition. In one example, a tip-in condition may be inferred based on a throttle change or a mass air flow change. In another example, a tip-in condition may be inferred based on a vehicle operator applying the accelerator pedal and a pedal position being moved beyond a threshold position (or by a threshold amount). As still another example, tip-in conditions may be inferred when the vehicle is accelerating. If there is a tip-in, condensate is purged from the CAC to the engine intake manifold during the tip-in at 224. Specifically, airflow to the intake manifold is increased based on the change in pedal position in order to increase torque (as requested by the vehicle operator). Additionally, the routine advances spark timing at 224 during the tip-in induced purge cycle to allow the desired torque to be provided while reducing misfire events induced by the condensate ingestion. In an alternate example, instead of advancing spark timing, an amount of spark retard is limited.

If a tip-in condition is not confirmed at 222, the method may perform a pro-active condensate clean-out routine to purge condensate form the CAC at 226. This may include increasing airflow to the intake manifold (without a corresponding change in pedal position), while maintaining torque, to purge condensate. Spark timing may be retarded during the clean-out cycle at 226 to reduce torque resulting from the increased air flow, thereby allowing the engine torque to be maintained during the purging. As elaborated at FIG. 4, additional conditions that may be assessed before initiating the pro-active condensate clean-out routine may include confirming that combustion stability and airflow are within predefined ranges of the blow-off airflow level. In this way, even if condensate levels are above the threshold value and airflow is within range of the blow-off airflow level, if stable combustion conditions are not met, the pro-active CAC clean-out routine may not proceed. Details on the pro-active clean-out cycle are presented in FIG. 5, explained further below.

Figure 3:
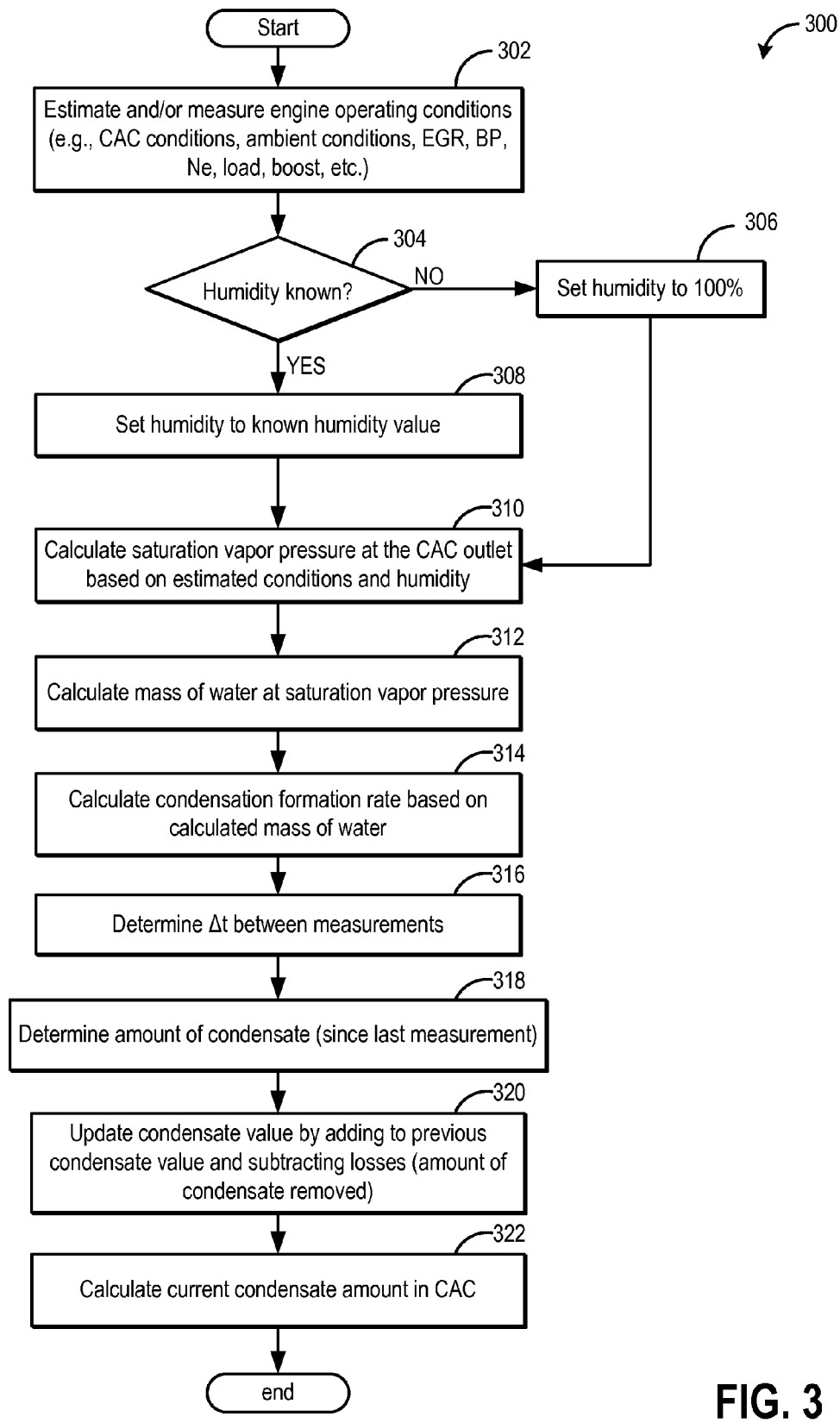
FIG. 3 shows a flow chart illustrating a method for determining the amount of condensate within a CAC according to an embodiment of the present disclosure.
Figure 4:
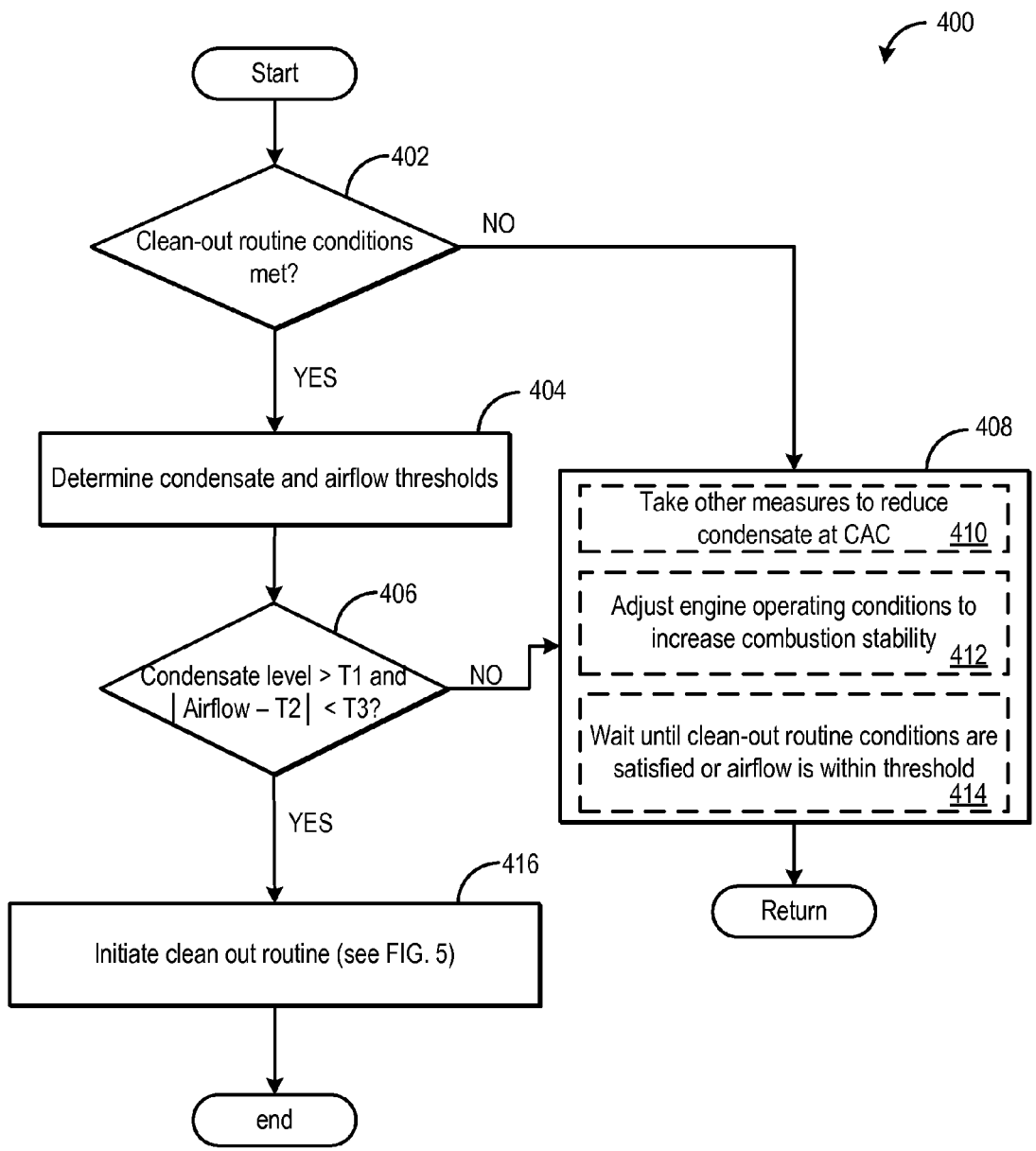
FIG. 4 shows a flow chart of a method for determining if conditions are present to enable a pro-active CAC clean-out routine.

FIG. 3 illustrates a method 300 for estimating the amount of condensate stored within a CAC. Based on the amount of condensate at the CAC relative to a threshold value, condensate purging routines, such as those discussed at FIG. 2, may be initiated.

The method begins at 302 by determining the engine operating conditions. These may include, as at 202, ambient conditions, CAC conditions, mass air flow, EGR flow, engine speed and load, boost, etc. Next, at 304, the routine determines if the ambient humidity is known. In one example, the ambient humidity may be known based on the output of a humidity sensor coupled to the engine. If the humidity is not known (for example, if the engine does not include a humidity sensor), the humidity may be set to 100% at 306. However, if the humidity is known, the known humidity value, as provided by the humidity sensor, may be used as the humidity setting at 308.

The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature indicates whether condensation will form within the cooler, and the mass air flow may affect how much condensation actually accumulates within the cooler. At 310, an algorithm may calculate the saturation vapor pressure at the CAC outlet as a function of the CAC outlet temperature and pressure. The algorithm then calculates the mass of water at this saturation vapor pressure at 312. Finally, the condensation formation rate at the CAC outlet is determined at 314 by subtracting the mass of water at the saturation vapor pressure condition at the CAC outlet from the mass of water in the ambient air. By determining the amount of time between condensate measurements at 316, method 300 may determine the amount of condensate within the CAC since the last measurement at 318. The amount of time between measurements may be based on engine operating conditions or outside weather conditions. For example, if conditions are present that may increase condensate formation, such as rain, the time between measurements may be shortened to better track condensate formation. In another example, the time between condensate measurements may be shorter if the condensate level in the CAC is approaching the threshold level for condensate purging. Alternatively, the time between measurements at 316 may be increased if the condensate level in the CAC is lower or if condensate-forming conditions (such as high humidity) are not present. In still other embodiments, the measurements may be taken at fixed, pre-determined intervals. In one example, estimation of the condensate forming as a fraction of air flow mass rate would be sampled much faster that actual conditions might change. Even at a the rate of 0.5 sec per sample, adequate estimation may be made for the purpose of tracking condensate at levels that might effect combustion during condensate ingestion. The current condensate amount in the CAC is calculated at 322 by adding the condensate value estimated at 318 to the previous condensate value and then subtracting any condensate losses since the last routine (that is, an amount of condensate removed. for example, via purging routines) at 320. Condensate losses may be assumed to be zero if the CAC outlet temperature was above the dew point. Alternatively, condensate losses above the dew point may be tracked via evaporation.

In addition to determining the amount of condensate in the CAC, method 300 may be used to determine condensate flow from the CAC to the engine intake manifold. For example, the CAC may be in three different states. In a first state, the CAC may be storing condensate such that the condensate level (determined at 322) is increasing. For example, if the amount of condensate at 318 or the condensation formation rate at 314 is a positive value, the condensate level in the CAC may be considered to be increasing. Herein, water may be removed from air circulating through the CAC and stored at the CAC. As such, during such conditions, due to removal of water from the circulating air, the humidity of air entering the intake manifold (after passage through the CAC) may be lower than the humidity of the ambient air (entering the CAC).

In a second state, the CAC may be releasing (e.g., purging) condensate form the CAC to the engine intake manifold such that the condensate level is decreasing. For example, if the amount of condensate at 318 or the condensation formation rate at 314 is a negative value, the condensate level in the CAC may be considered to be decreasing. Herein, water already stored at the CAC may be released into the intake manifold. As such, during such conditions, due to removal of water from the CAC, the humidity of air entering the intake manifold (after passage through the CAC) may be higher than the humidity of the ambient air (entering the CAC). Here the release may be either due to air mass velocity or evaporation. The condensate storage decrease or condensate removal may occur as a function of air mass flow rate when the flow rate is above a threshold, with the rate of decrease being relatively linear with airflow. As such, the evaporative component of water release happens at a much lower rate, and would only be considered in the determination of condensate storage decrease at long steady state cruise conditions where condensate is not formed.

In a third state, the CAC may be at steady-state where the condensate level in the CAC is substantially constant (that is, neither increasing nor decreasing). For example, if the amount of condensate at 318 or the condensation formation rate at 314 is at or around zero, the condensate level may be considered to be at steady-state. During the steady state, the intake manifold humidity may be substantially the same as the ambient humidity.

Turning now to FIG. 4, a method 400 is presented for determining if a pro-active CAC clean-out procedure may be performed. Specifically, method 400 confirms if conditions are present to enable a pro-active CAC clean out routine (wherein airflow through the CAC is actively increased without a corresponding increase in torque) without inducing misfire during the water ingestion.

Method 400 includes, at 402, determining if engine operating conditions are satisfied to enable the clean-out routine. These may include, for example, operating requirements for stable combustion conditions. Operating requirements for stable combustion may include engine coolant temperature being above a threshold, spark retard being within a threshold, VCT not being retarded greater than a threshold, EGR level being below a threshold, and fuel quality within a predetermined level, for example. If these conditions are not met, a pro-active CAC clean-out routine may not be performed as combustion stability may be affected. In response to the conditions not being met, the routine proceeds to 408 where several steps may be performed to enable CAC condensate to be purged without a pro-active clean-out routine being performed.

As one example, at 410, the engine controller may take measures to reduce condensate formation at the CAC, such as by adjusting CAC efficiency. CAC efficiency may be adjusted (e.g., decreased) through the use of a grille shutter system or a cooling fan. For example, the opening of the grill shutters may be decreased so as to decrease the external cooling airflow through the CAC and decrease the CAC efficiency.

In another example, at 412, the controller may adjust one or more engine operating parameters or actuators to improve or increase engine combustion stability. For example, an amount of spark retard applied may be reduced or limited during condensate ingestion. Upon improving the combustion stability, the routine of FIG. 4 may be restarted so that a CAC clean-out routine can be performed while combustion stability is within a threshold.

In yet another example, at 414, the controller may wait until the pro-active CAC clean-out conditions (as previously elaborated at 402) are satisfied. That is, the pro-active condensate clean-out routine may be delayed until the selected engine conditions of 402 are met. Alternatively, if the clean-out routine was not initiated due to airflow conditions not being met (that is, airflow not being within a threshold range at 406), then the controller may wait and delay the CAC clean-out routine until airflow conditions are met (that is, until airflow is within the threshold range).

The controller may select one of the alternate options (410, 412, 414) depicted at 408 based at least on the amount of condensate within the CAC. For example, if a larger amount (e.g., more than a threshold amount) of condensate has built up within the CAC, or the rate of condensate formation is higher (e.g., more than a threshold rate), a clean-out procedure may need to be performed sooner. In this case, the system may choose to actively adjust engine operating conditions, rather than delaying initiation of the clean-out routine until the conditions are satisfied on their own. In some examples, the routine may employ several of the options 410, 412, 414. For example, at 408, the controller may perform one or more alternate measures to reduce condensate formation (such as via grill shutter adjustments that reduce the CAC efficiency and thereby reduce condensate formation at the CAC), along with adjusting engine operating conditions to increase combustion stability.

Returning to 402, if the engine conditions for enabling a clean-out routine are met, the routine determines the appropriate condensate thresholds (T1) and airflow thresholds (T2 and T3) at 404. As such, when condensate build-up in the CAC is above a first threshold, $T_1$, the need for the CAC clean-out routine may be indicated. This first (condensate) threshold T1 may vary depending on vehicle operating conditions including, burn rate, an engine temperature, and a spark timing for example. In some situations, when engine burn rates are faster, the engine may tolerate a larger amount of condensate being blown off the CAC. Therefore, first (condensate) threshold $T_1$ may be set to a higher value when burn rates are higher and/or engine temperatures are higher. Conversely, when burn rates are slower and/or engine temperatures are lower, first (condensate) threshold $T_1$ may be set at a lower value. In another example, first (condensate) threshold $T_1$ may be decreased as spark retard increases. Thus, first (condensate) threshold T1 may have a higher value when the spark ignition timing is not retarded and a smaller value when spark ignition timing retarded. By adjusting the condensate threshold based on spark timing, misfire events during condensate blow-off may be reduced. In one example, the rate of condensate ingestion as a function of air mass flow rate may be the primary (e.g., dominant) factor unless the threshold level is low enough such that any ingestion rate will not cause a misfire. Likewise, spark timing may be adjusted as a function of ingestion rate or based on feedback from an intake oxygen sensor.

Airflow thresholds T2 and T3 may also be set at 404 such that the airflow traveling through the CAC and into the engine intake is within a range of a blow-off airflow level. The blow-off airflow level may be defined as the amount of airflow needed to purge a certain amount of condensate out of the CAC during the clean-out procedure. Therefore, at 404, the routine determines both the blow-off airflow level, dependent upon the amount of condensate in the CAC, and the airflow thresholds to enable clean-out. For example, the airflow threshold may be defined such that: |Airflow−T2|<T3. In this equation, T2 may be the blow-off airflow level, airflow is the current airflow traveling through the CAC and into the intake manifold, and T3 is a set airflow threshold value. In other words, a clean-out routine may be initiated only if the airflow through the CAC is above or below the blow-off airflow level T2 by less than the set airflow threshold T3. That is, airflow may need to be within a range defined by threshold T2−T3 at the lower end and threshold T2+T3 at the upper end. In this way, airflow through the controller during a purging is controlled so that condensate blow-off can be controlled. The blow-off may be zero below the threshold and a percent of the air mass as air mass increases above the minimum threshold. This allows the blow-off to be performed slowly and reduces the likelihood of engine misfires, or degradation of engine performance. The airflow threshold, T3, may be set so combustion stability is maintained throughout the clean-out procedure. Alternatively, instead of a total level, a threshold rate of ingestion may be set. The ingestion rate may then be controlled by controlling the air flow rate (e.g., by clipping the air mass flow rate until condensate is purged). In order to maintain combustion stability, the parameters that are altered to maintain torque demand throughout the clean-out procedure may need to stay within certain thresholds. These parameters may include spark timing, alternator load, VCT, and AFR. Therefore, $T_3$ may be set such that these parameters are not increased or decreased outside their thresholds for combustion stability. For example, threshold T3 may be set so that spark retard is not increased above a level that may cause combustion instability.

Once all condensate and airflow thresholds are determined, method 400 verifies at 406 if the current condensate and airflow levels are within these thresholds. For example, the routine checks if the condensate level, as determined in method 300, is above threshold $T_1$. The routine may also check if the airflow is within the threshold range, that is, |Airflow−T2|<T3. If both of these conditions are met, the routine continues on to 416 where the CAC clean-out routine is triggered. Details of this clean-out routine are outlined in FIG. 5 and discussed further below. However, if the conditions at 406 are not met, the routine returns to 408 where one or several actions are taken, as discussed above. For example, the routine may include waiting until airflow is within the specified threshold at 414.

Figure 5:
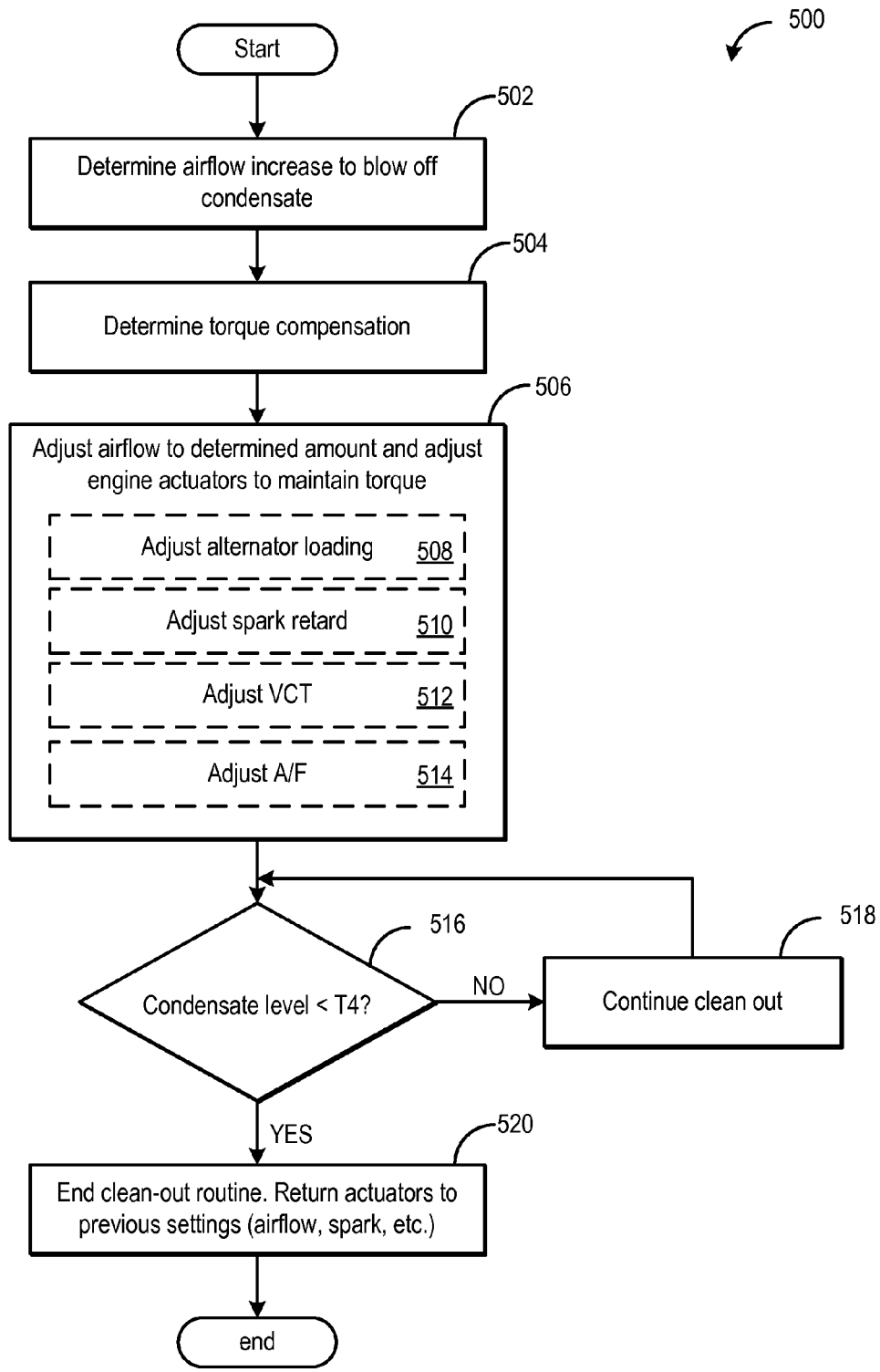
FIG. 5 shows a flow chart of a method for performing a pro-active CAC clean-out routine.

FIG. 5 illustrates a method 500 for performing a pro-active clean-out routine of the CAC. Method 500 may be carried out by controller 12 according to instructions stored thereon. Method 500 includes, at 502, determining the airflow increase required to blow off the condensate in the CAC. This may be determined from the amount of condensate in the CAC, calculated by method 300, and the corresponding blow-off airflow level (threshold T2, as discussed with regard to FIG. 4 above). The method continues on to 504 to determine the torque compensation required for the airflow increase determined at 502. As such, a torque compensation is required herein since the increase in airflow is not due to a change in pedal position or a request for increased torque demand by the vehicle operator. Rather, since the increase in airflow is for blowing off condensate from the CAC into the engine. Thus, as the airflow level increases, a larger torque compensation may be required to allow overall engine torque to be maintained. At 506, the controller increases airflow through the CAC by the specified amount, while at the same time adjusting one or more engine actuators to maintain engine torque. Airflow through the CAC may be increased by increasing mass air flow via an intake throttle, and retarding spark advance to maintain torque output. In one example, increasing airflow via the intake throttle increases airflow to the intake manifold of the engine. Thus, by adjusting engine actuators while increasing airflow, a total torque may be reduced so that an actual torque demand can be maintained during the condensate purge cycle.

Adjusting engine actuators to maintain torque may include adjusting the alternator loading at 508. For example, increasing the alternator load applied on the engine may decrease torque, compensating for increased engine airflow. An alternator load applied on the engine may be increased by adjusting an alternator coil current. Adjusting actuators may also include adjusting spark retard at 510. In one example, increasing spark retard (that is, retarding spark further away from MBT) may decrease torque and help to maintain the requested torque demand. Alternatively, at 512, adjusting actuators may include adjusting VCT. In some embodiments, retarding VCT may reduce torque, compensating for the increase in engine airflow. In yet another example, adjusting actuators may include adjusting the air-to-fuel ratio (AFR) at 514. Specifically, fuel enleanment may be used to increase the AFR, reducing the power output at a larger throttle opening. Thus, in one example, increasing the AFR may compensate for the increased airflow entering the intake manifold of the engine and help to maintain torque.

In some embodiments, a combination of the above parameters may be adjusted to offset the airflow increase and maintain torque. In other embodiments, a priority hierarchy may be employed for these adjustment parameters based on their effect on combustion stability. For example, increasing alternator load may not increase combustion instability to the same degree as VCT or spark adjustments might. Thus, the priority hierarchy at 506 may include adjusting alternator loading first and then (if further torque reduction is required) moving on to adjust spark timing, VCT, and/or AFR. In some embodiments, a trigger may be set to move on to the next parameter in the hierarchy. For example, alternator loading may be initially used to reduce torque and once a maximum alternator load has been applied on the engine, the trigger may be set so that the residual torque decrease is met using VCT, spark timing or AFR adjustments. The order of priority may also be altered depending on engine operating conditions and other vehicle operating operations, such as a vehicle speed, a vehicle mode of operation, a battery state of charge, etc. Example actuator adjustments performed during a pro-active clean-out routine are elaborated herein with reference to FIGS. 7-8.

After making all adjustments to enable the CAC clean-out routine at 506, method 500 checks the condensate level in reference to a threshold, T4, at 516. If the amount of condensate in the CAC has been sufficiently purged and is less than T4, the clean-out cycle ends at 520 and all engine actuators and parameters are returned to their original settings (or to revised settings that are based on the current torque request). These parameters may include airflow, spark timing, VCT, throttle position, AFR, and alternator loading. However, if the amount of condensate in the CAC is not less than threshold T4, the clean-out cycle continues purging condensate from the CAC at 518.

In an alternate embodiment, instead of ending the purging routine based on the level of condensate in the CAC, the clean-out routine may be ended based the elapse of a threshold duration since the initiation of the purging routine. For example, a timer may be started at 506 when the purging routine is initiated and a signal to end the clean-out cycle may be set at 516 in response to a set amount of time having elapsed on the timer. The threshold duration monitored on the timer (herein also referred to as the cycle time) may be adjusted based on engine operating conditions and the amount of condensate in the CAC. Specifically, in one example, in response to a larger amount of condensate in the CAC, a longer threshold duration may be allowed to elapse.

As such, introduction of water into the engine during condensate purging (e.g., purging during a tip-in or purging during a pro-active clean out routine) from a CAC may increase the likelihood of misfire events. In one example, this may be addressed by adjusting spark timing during condensate purging (clean-out cycle) and/or during condensate storing. As elaborated herein with reference to FIG. 6, an initial borderline knock limit may be set based on ambient humidity. The initial borderline setting may also include an initial amount of spark retard from MBT. Condensate flow from the CAC (during storing and purging) may alter the humidity of the intake manifold relative to the ambient humidity. Thus, intake manifold humidity and CAC condensate flow state may be used to modify these initial settings to reduce engine misfire events and maintain torque during condensate purging.

Figure 6:
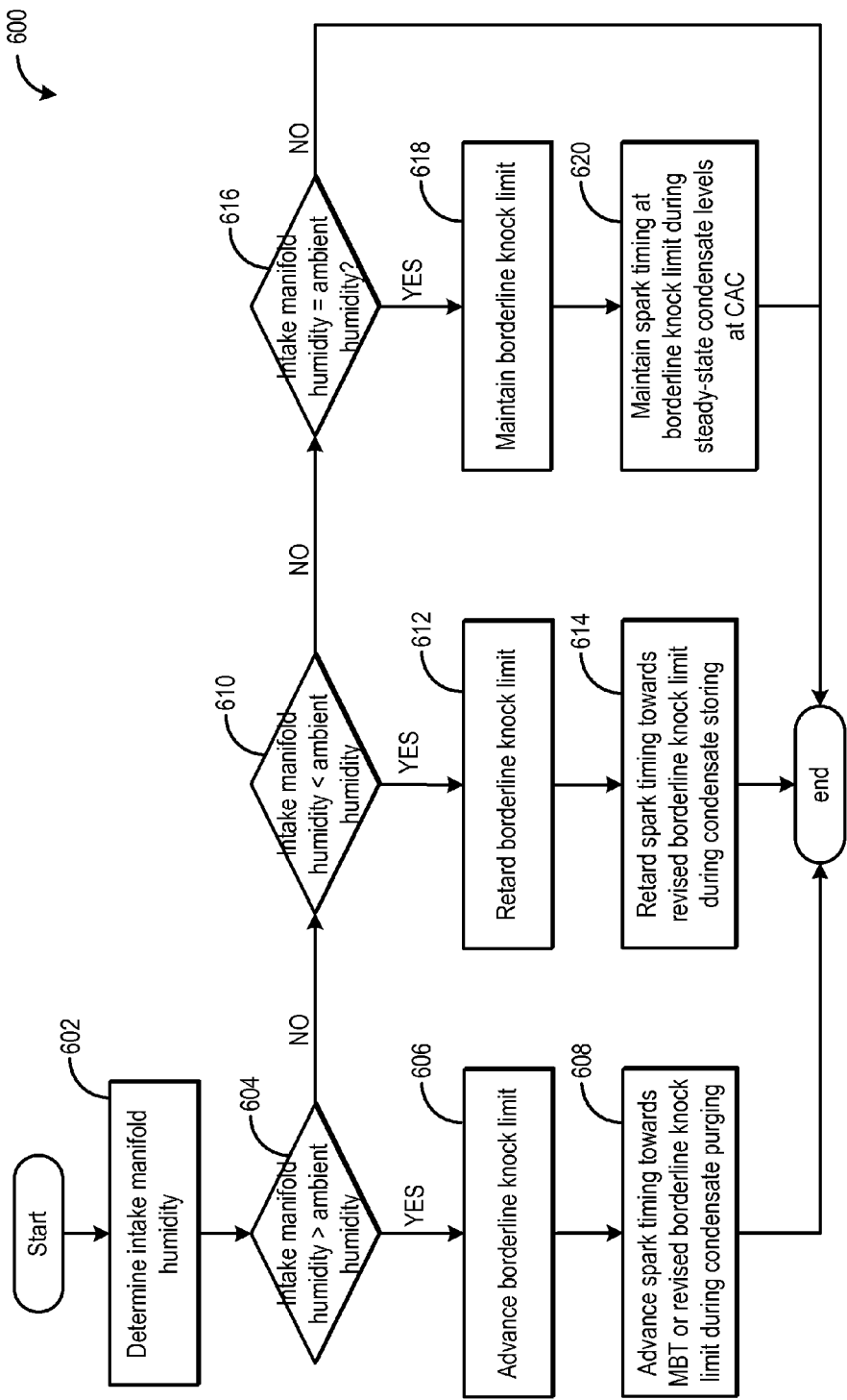
FIG. 6 shows a flow chart of a method for adjusting a borderline knock limit and a spark ignition timing based on humidity and condensate level in a CAC.

Turning now to FIG. 6, an example method 600 for adjusting a borderline knock limit and spark timing based on ambient humidity and condensate level in the CAC is shown. Method 600 includes, at 602, determining the engine intake manifold humidity. In one example, intake manifold humidity may be accurately determined from an engine intake manifold oxygen sensor. In another example, humidity may be determined by a downstream pre catalyst UEGO during a deceleration fuel shut off (DFSO) event. However, this device may not be able to respond quickly enough to make spark adjustments as the condensate is ingested. In yet another example, intake humidity may be estimated based on engine operating conditions, the condensate storage level in the CAC, and condensate flow (e.g., amount, flow rate, etc.) from the CAC (as previously determined in method 300). At 604, the intake manifold humidity is compared to the ambient humidity. If the intake manifold humidity is greater than ambient humidity at 604, the routine advances the borderline knock limit at 606. In particular, the knock limit may be advanced to take advantage of the knock-reducing effect of increasing humidity on the engine. At 608, the routine then advances spark timing towards MBT or the revised borderline knock limit during condensate purging (that is, during decreasing condensate level in the CAC). For example, during a condensate clean-out cycle due to tip-in, when condensate is being purged to the engine intake, the intake manifold humidity may be higher than the ambient humidity. During such conditions, spark timing may be advanced past the initial borderline knock setting towards MBT or the new borderline knock limit. The amount of spark advance may be adjusted to maintain engine torque during the condensate clean-out cycle. For example, the amount of spark advance may be based on pedal position, engine speed, and/or throttle position. Torque reduction via spark advance is then determined as a function of how much the spark is retarded from MBT spark. Additionally, or alternatively, closed loop feedback may be used from the crankshaft acceleration to advance the spark if burn rates are slow and limit spark advance based on borderline feedback from the knock sensor.

If the intake manifold humidity is not greater than ambient humidity at 604, then at 610, it is determined if the intake manifold humidity is less than the ambient humidity. If yes, the routine retards the borderline knock limit at 612. In particular, the knock limit may be retarded to compensate for the effect of decreasing humidity on engine knock. The routine then retards spark timing to the revised borderline knock limit during condensate storage (that is, during increasing condensate level in the CAC) at 614. For example, during periods of increasing condensate level (storage) at the CAC, spark timing may be retarded from the initial amount of spark retard to a final, larger amount of spark retard. The amount of spark retard may be adjusted to maintain engine torque during condensate storage.

If the intake manifold humidity is not lower than ambient humidity at 610, then at 616, it may be determined is the intake manifold humidity is substantially the same as ambient humidity. As such, during steady-state condensate levels at the CAC, where condensate levels are neither increasing nor decreasing, but staying substantially the same, the intake manifold humidity may be substantially the same as ambient humidity. If the intake manifold humidity is substantially the same as ambient humidity, the routine maintains the initial borderline knock limit at 618. Then, at 620, spark timing is maintained at the borderline knock limit during the steady-state condensate levels at the CAC. After all adjustments to the borderline knock limit and spark timing are made, the routine ends.

Figure 7:
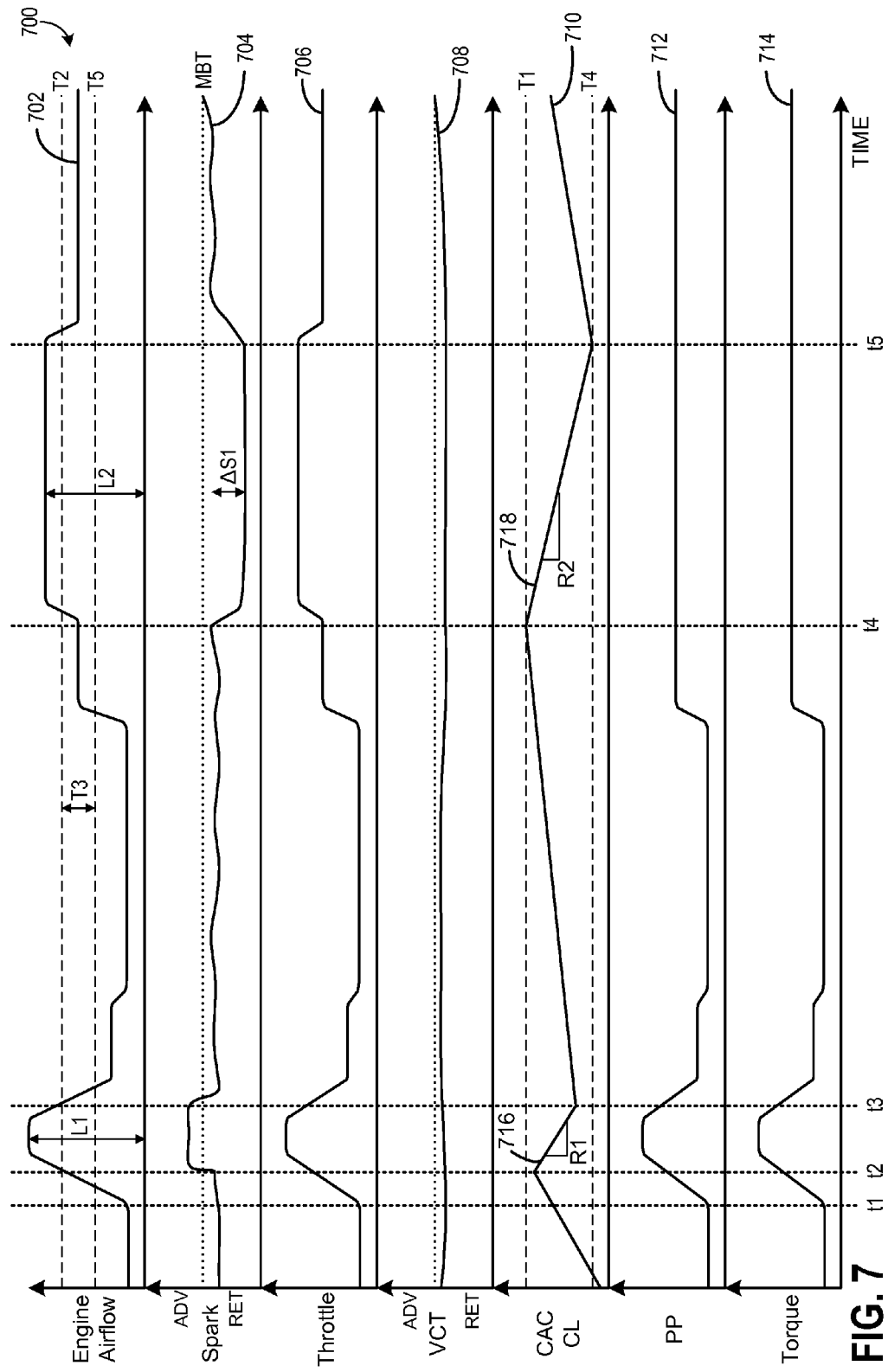
FIGS. 7-8 show example condensate purging operations.

FIG. 7 illustrates a graphical example of a pro-active CAC clean-out routine using the methods previously presented in FIGS. 2-5. Graph 700 shows an example of engine airflow at plot 702, spark timing at plot 704, throttle opening at plot 706, variable cam timing (VCT) at plot 708, charge air cooler condensate level (CAC CL) at plot 710, pedal position (PP) at plot 712, and engine torque at plot 714 over time (along the x-axis). In this example, engine airflow increases in response to CAC condensate level, initiating a clean-out (purge) procedure which includes adjusting spark timing to maintain torque.

Prior to t1, a CAC condensate level (CAC CL) is increasing (710) while PP (712), torque (714), VCT (708), throttle opening (706), spark timing (704), and engine airflow (702) remain relatively constant. At time t1, the vehicle accelerates in response to a tip-in, as indicated by an increase in pedal position (712). As a result, to meet the increased torque request, the throttle opening increases (706), increasing engine airflow (702) and torque (714). At time t2, engine airflow (702) increases above threshold T2 which corresponds to the CAC blow-off airflow level (that is, an airflow level above which CAC condensate can be blown off into the engine intake). Thus, at t2, the CAC condensate level (710) starts decreasing at a rate R1 until time t3, when engine airflow decreases below T2. This first example of condensate blow-off during a tip-in (depicted at 716) does not cause engine misfire since the amount of condensate is smaller (under threshold level T1). As such threshold level T1 may correspond to a level of condensate that triggers a pro-active clean-out cycle.

It will be appreciated that in an alternate embodiment, the rate at which the condensate level decreases (R1) may be a factor for misfire control. However, if the total amount of condensate is small enough, the rate of decrease may not be a factor in misfire control. As such, to control the ingestion rate, the rate of change in airflow may be slowed via adjustments to the throttle. However, this may lead to the vehicle driver experiencing a real and perceived difference in performance/acceleration. It will be appreciated that if the vehicle is a hybrid application, electric motor torque may be used to make up or deliver the total driver demanded torque, while managing the rate of change in airflow or condensate to the engine. In this case the hybrid electric machine would be outputting torque in lieu of absorbing toque (such as may be used for a pro-active clean out to increase engine air flow).

After time t3, as time progresses in example 700, CAC condensate level starts to increase again until time t4, when it reaches threshold level T1 (710). At this point, engine airflow is between lower threshold T5 and upper threshold T2 such that |Airflow−T2|<T3 (702). In this example, T3 is the difference between the condensate blow-off level, T2, and airflow threshold T5. Since engine airflow is within the set threshold range (that is less than upper threshold T2 but above lower threshold T5), and the condensate level in the CAC is above threshold T1, a pro-active CAC clean-out routine is triggered. Accordingly, a throttle opening is increased at t4 (706), increasing engine airflow above threshold T2 (702). At the same time, the controller increases spark retard by a larger amount ΔS1 (704), so as to maintain torque demand throughout the clean-out procedure (714). The condensate level in the CAC starts to decrease slowly at a rate R2 (710). During this second condensate purging with a pro-active routine (depicted at 718), the purging rate R2 is less than the purging rate R1 (during the previous purging operation at 716) because engine airflow is at a lower level (L2 at 718 vs. L1 at 716). Engine airflow (702), spark timing (704), and torque (714) are held steady until time t5, when the condensate level in the CAC decreases to threshold level T4 (710). This ends the clean-out procedure, and returns all parameters back to their previous or currently requested settings.

With regard to FIG. 7, the CAC clean-out procedure triggered at time t4 (shown at 718) could proceed in many different ways, depending on engine operating conditions. In the depicted example, torque compensation is achieved by adjusting only a single engine operating parameter, specifically, by increasing spark retard only (704). By retarding the spark timing, torque remains constant despite increased airflow. Thus, the vehicle operator is not aware of any change in vehicle performance and drivability is not affected. However, in alternate examples, torque compensation may be performed by adjusting a combination of different engine actuators, as discussed previously at FIG. 5 (at 506). These actuators may adjust engine controls such as alternator loading, spark timing, VCT, and AFR. Specifically, several of these parameters may be adjusted at once to maintain torque demand during the clean-out routine. An example of such a purging routine is depicted in FIG. 8.

Figure 8:
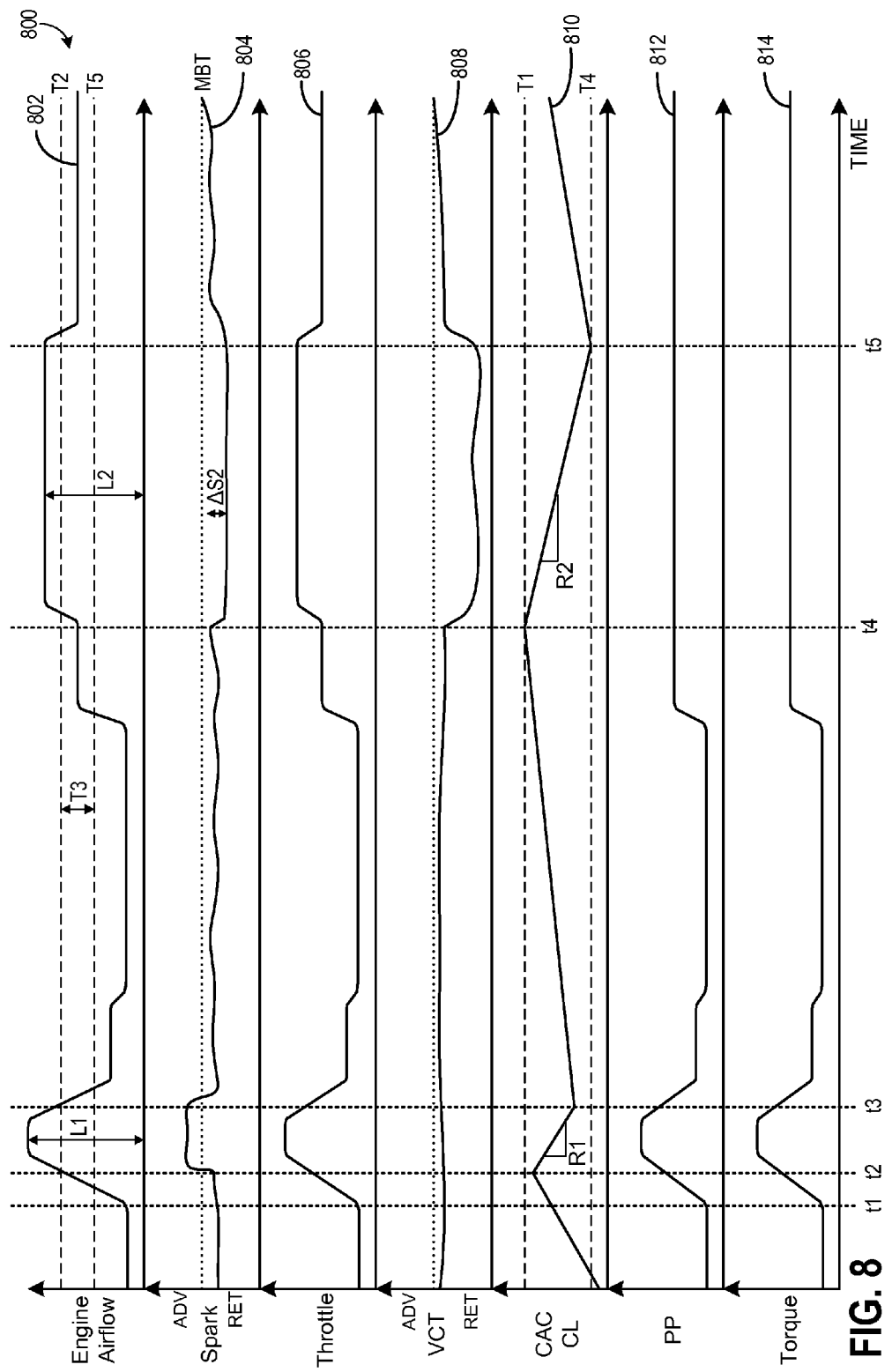

FIG. 8 illustrates an alternative graphical example 800 of the methods presented in FIGS. 2-5. Graph 800 again shows an example of engine airflow at plot 802, spark timing at plot 804, throttle opening at plot 806, variable camshaft timing (VCT) at plot 808, charge air cooler condensate level (CAC CL) at plot 810, pedal position (PP) at plot 812, and engine torque at plot 814 over time. Engine airflow increases in response to CAC condensate level, triggering a clean-out procedure which includes adjusting spark timing and VCT to maintain torque.

Graphical example 800 proceeds in the same way as graphical example 700, until time t4. At t4, condensate level in the CAC reaches threshold T1 (810) and airflow level is between T5 and T2 (802). As a result, the CAC clean-out procedure is initiated. The throttle opening is increased at t4 (806), increasing engine airflow above T2 (802). At the same time, the controller adjusts a combination of parameters to maintain torque throughout the clean-out procedure.

Unlike example 700 which only adjusted the spark timing, the controller adjusts both spark timing and VCT in example 800. At t4, spark timing is retarded by a smaller amount ΔS2 (804) (which is less than the spark retard ΔS1 applied in example 700). Herein, since VCT is also retarded in example 800 (see plot 808), spark timing may be retarded to a lesser degree. That is, by using concomitant VCT adjustments, an amount of spark retard applied during the clean-out routine may be decreased. In still other examples, an increase in alternator load and/or AFR may be implemented in addition to, or in combination with, these parameters to maintain torque. At t5, the clean-out procedure ends and all parameters are returned to their previous or currently requested settings.

Figure 9:
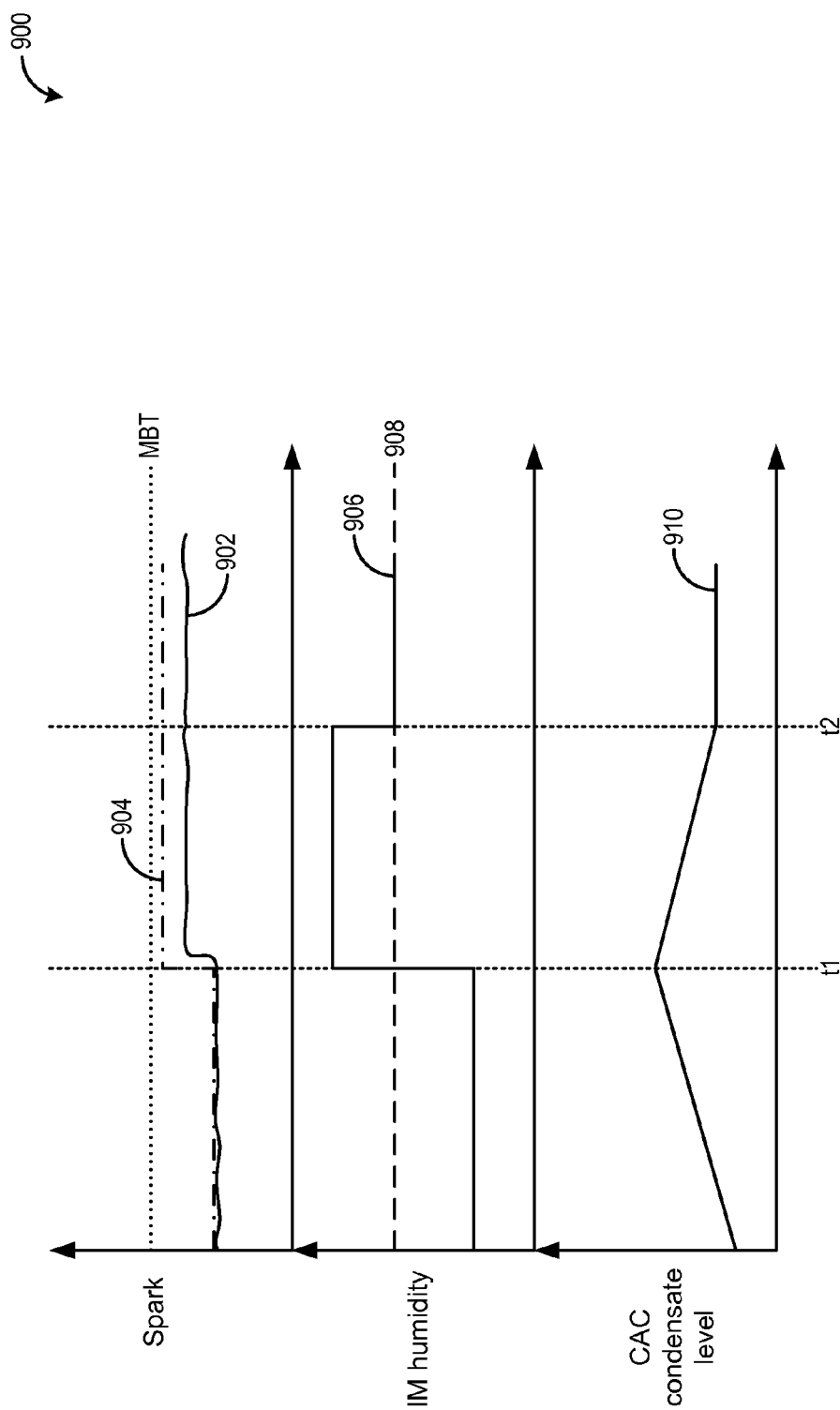
FIG. 9 shows a graphical example of adjusting a borderline knock limit and spark timing in response to intake manifold humidity and CAC condensate level.

FIG. 9 shows a graphical example of method 600 for adjusting a borderline knock limit and spark timing based on ambient humidity and condensate level in a CAC. Example graph 900 illustrates adjustments to a borderline knock limit at 904, spark timing at plot 902, changes in an engine intake manifold humidity at plot 906, and CAC condensate level at plot 910.

Before time t1, condensate may be being stored at the CAC. Due to continued removal of water from intake air into the charge air cooler, the intake manifold humidity (906) is lower than ambient humidity (908). During this time, the CAC is operating in a first condition where condensate level is increasing (910), indicating storing of condensate in the CAC. In response to the intake manifold humidity being lower than the ambient humidity, the borderline knock limit may be retarded (904) to compensate for the increased knock effect that may result from the lower intake manifold humidity. In addition, during this first condition, spark timing is retarded from MBT to the revised borderline knock limit.

At time t1, the level of condensate stored at the CAC may rise above a threshold. In response to a pedal tip-in CAC purging may be performed. Due to continued removal of water from the charge air cooler into the engine intake, the intake manifold humidity (906) increases above ambient humidity (908). Intake manifold humidity remains higher than ambient humidity until time t2. During this time, the CAC is operating in a second condition where condensate level is decreasing (910) due to a purge (CAC clean-out) cycle. In response to the intake manifold humidity being higher than the ambient humidity, the borderline knock limit may be advanced (904) to take advantage of the knock-reducing effect that may result from the higher intake manifold humidity. In addition, in response to condensate purging, the controller advances spark timing to MBT.

After time t2, intake manifold humidity (906) may be substantially at or around ambient humidity (908). Accordingly, the borderline knock limit is returned to MBT (904). Herein, the CAC may be operating in a third condition after time t2 where the condensate level is at steady-state (910). During the third condition, the controller maintains spark timing at MBT (902).

In this way, borderline knock limits and spark timing may be retarded during condensate storing at a CAC while borderline knock limits and spark timing are advanced during condensate release from a CAC. By adjusting the borderline knock limit and spark timing responsive to water ingestion from a CAC, engine misfire events and loss of torque caused due to water ingestion can be reduced.

Figure 10:
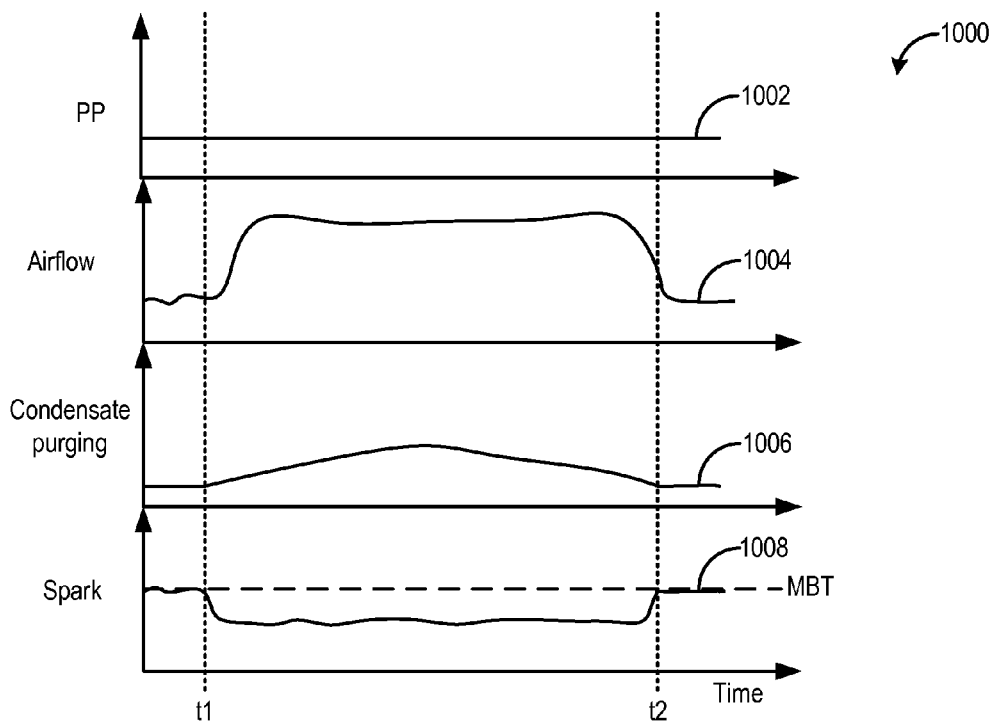
FIG. 10 shows a graphical example for adjusting spark timing in response to purging condensate from a charge air cooler during a pro-active clean-out cycle.

Turning now to FIGS. 10 and 11, two graphical examples are shown for adjusting spark timing in response to purging condensate from a charge air cooler for two different driving conditions. In FIG. 10, condensate is purged from a CAC during a pro-active clean-out cycle. This clean-out cycle is initiated in response to a condensate level in a CAC, while pedal position is maintained below a threshold value (that is, not a tip-in condition). Graph 1000 displays pedal position (PP) at plot 1002, airflow to the intake manifold (airflow) at plot 1004, condensate purging at plot 1006, and spark timing (spark) at plot 1008.

Before t1, no condensate purging may be performed, for example, the condensate level at the CAC being less than a threshold amount. At time t1, in response to the condensate level increasing above the threshold, a condensate purging routine is initiated. In particular, a pro-active clean-out routine is initiated. Accordingly, to purge the condensate, an airflow to the intake manifold is increased (e.g., above a blow-off airflow level) as shown at plot 1004. Herein, the increase in airflow is responsive to the condensate level in the CAC. That is, air flow is increase even though a pedal position remains below a threshold (1002) and no request for increased torque is received from the vehicle operator. The increase in airflow enables purging of the condensate from the CAC (1006). Since condensate purging is triggered by a controlled method (method 400) based on condensate level and airflow thresholds, a lower amount of condensate is purged per engine cycle and further the purging is performed for a longer duration. In response to prolonged condensate purging at a lower purge rate (that is, a lower amount of purging per cycle), spark timing is retarded (1008) from MBT. Herein, the spark retard is used to maintain engine torque constant. At time t2, the condensate clean-out cycle finishes due to the condensate level returning below a threshold. Accordingly at t2, airflow is reduced and returned to original settings (1004), ending condensate purging (1006). Spark timing is also returned to MBT (1008).

With regard to FIG. 11, condensate is purged from a CAC during a tip-in, illustrated by an increase in pedal position. Condensate is purged from the CAC in response to an increase in airflow to the intake manifold, caused by a tip-in. Graph 1100 displays pedal position at plot 1102, airflow to the intake manifold (airflow) at plot 1104, condensate purging at plot 1106, and spark timing (spark) at plot 1108.

Before t1, no condensate purging may be performed, for example, the condensate level at the CAC being less than a threshold amount. At time t1, airflow to the intake manifold increases above a blow-off airflow level (1104), responsive to a pedal position exceeding a threshold, indicating a tip-in (1102). The increase in airflow then purges the condensate from the CAC (1106). Since condensate purging is triggered by a tip-in, a higher amount of condensate per cycle is purged over a shorter duration. In response to expedited condensate purging at a higher purge rate (that is, a higher amount of purging per cycle), spark timing is advanced (1008) towards MBT. Herein, the spark advance is used to reduce the likelihood of misfire and increase engine torque. At time t2, pedal position decreases (1102), ending the tip-in. Airflow is returned to an original, lower level, decreasing condensate purging (1106). Spark timing is also returned to its previous amount of spark retard (1108).

In this way, condensate may be purged from a CAC into an intake manifold, while adjusting spark timing based on the amount of condensate purged per cycle. The amount of condensate purged per cycle may be based on ambient conditions and engine operating conditions, including ambient temperature, ambient humidity, intake air EGR content, mass air flow, and CAC outlet temperature. The amount of condensate purged per cycle may be further based on pedal position. For example, the amount of condensate purged per cycle may increase as a pedal position exceeds a threshold position (e.g., during a tip-in) and an air mass flow rate increases. Spark timing may be advanced or retarded based on the nature of the purge, for example, based on whether the purge is during a tip-in vs. a pro-active clean-out. In the tip-in example, when the amount of condensate purged per cycle is higher (e.g., higher than a threshold), spark timing may be advanced. The amount of spark advance may be based on a pedal position (e.g., degree of tip-in), and an operator torque demand. As another example, the amount of spark advance may be changed from a base value based on the estimated condensate ingestion rate or the measures rate of condensate ingestion (e.g., as determined based on an intake oxygen sensor). Herein, the feedback from the intake oxygen sensor may provide an estimate on the amount of water in the intake. In another example, such as during a pro-active CAC clean out, where the amount of condensate purged per cycle is lower (e.g., lower than the threshold), spark timing may be retarded to maintain engine torque constant while airflow is increased.

As described above, condensate may be purged from a CAC by increasing airflow to the engine intake manifold. Airflow may increase to a condensate blow-off level in response to a driver-initiated tip-in or a periodic, pro-active condensate clean-out cycle. During condensate purging, engine actuators may be adjusted to maintain torque demand. Engine actuator adjustments may include adjusting spark timing, VCT, alternator loading, and AFR ratio. By adjusting engine actuators to maintain torque demand, an increase in airflow to purge the CAC may go unnoticed by the vehicle operator. Spark timing adjustments may also be based on the condensate level in the CAC, intake manifold humidity, ambient humidity, and flow of condensate from the CAC. In particular, spark advance may be increased when a CAC is purged during a tip-in to compensate for the higher humidity that may slow down a burn rate and decrease the risk of knock. By increasing spark advance, combustion stability is enhanced and misfire risk is reduced. Calculations of the amount of condensate in the CAC may also be used to determine when a clean-out cycle is required. If all engine operating conditions and engine airflow thresholds are met, a clean-out cycle may be triggered. In this way, performing periodic condensate clean-out cycles may help to prevent ingestion of large amounts of condensate at once and engine misfire. By utilizing methods to adjust spark timing during periods of condensate storing and purging, engine misfire may be reduced.

As will be appreciated by one of ordinary skill in the art, routines described herein may represent one or more of any number of CAC clean-out procedures using various engine actuator controls. As such, various steps or functions illustrated may be performed in the sequence illustrated, in parallel, or in some cases omitted. Likewise, the order of control is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

The subject matter of the present disclosure includes all novel and nonobvious combinations and sub-combinations of the various processes, systems and configurations, and other features, functions, acts, and/or properties disclosed herein, as well as any and all equivalents thereof.

The invention claimed is:

1. A method of controlling airflow delivered to an engine, comprising an electronic controller of the engine including non-transitory instructions to execute:

determining a condensate level in a charge air cooler; and
controlling an intake throttle to increase airflow to the engine from an initial level responsive to the condensate level being determined in the charge air cooler being greater than a threshold level and the initial airflow level being below a blow-off airflow level and while a signal received at the electronic controller indicating a pedal position remains unchanged.

2. The method of claim 1, wherein the signal received at the electronic controller indicating pedal position remains unchanged indicates that pedal position is not increasing to request the increase in airflow and further comprising:
   maintaining torque as requested based on the indicated pedal position during the increasing airflow by controlling via the electronic controller at least one actuator coupled to the engine to adjust at least one of spark retard timing, variable camshaft timing, alternator load, and air-to-fuel ratio.

3. The method of claim 1, wherein the condensate level is determined via the electronic controller based on signals received at the electronic controller of at least one of mass air flow, ambient temperature, charge air cooler outlet temperature, charge air cooler pressure, ambient pressure, and an EGR amount.

4. The method of claim 3 wherein the condensate level is further determined via the electronic controller based on input received at the electronic controller from an ambient humidity sensor coupled to the engine.

5. The method of claim 1, wherein the condensate level is determined via the electronic controller based on signals received at the electronic controller of a charge air cooler outlet temperature and at least one of a charge air cooler pressure to ambient pressure ratio and engine load.

6. The method of claim 1,
   wherein an amount of increase in airflow is determined by the electronic controller based on a difference between the initial airflow level and the blow-off airflow level,
   wherein the blow-off airflow level is determined by the electronic controller based on the condensate level being determined, and
   wherein controlling the intake throttle to increase airflow to the engine includes increasing an amount of opening of the intake throttle to increase airflow to the engine to above the blow-off airflow level.

7. The method of claim 1, wherein the threshold level of condensate, which is determined by the electronic controller, is adjusted based on engine operating conditions including at least one of burn rate of the engine, a temperature of the engine, and a spark timing of the engine.

8. The method of claim 7, wherein the electronic controller increases the threshold level of condensate as the temperature of the engine increases.

9. The method of claim 7, wherein the electronic controller increases threshold level of condensate as spark retard decreases.

10. The method of claim 1, further comprising, during the increase in airflow, reducing an amount of EGR.

11. The method of claim 1, wherein the initial airflow level being below the blow-off airflow level includes the initial airflow level being within a threshold airflow range, of the blow-off airflow level.

12. An engine method of controlling airflow delivered to an engine, comprising an electronic controller of the engine including non-transitory instructions to execute:
   determining a condensate level in a charge air cooler; and
   increasing airflow to the engine to a level greater than requested by an operator of a vehicle in which the engine is installed, without increasing engine torque by adjusting at least one actuator coupled to the engine comprising at least one of an intake throttle valve, an alternator, a spark plug, a camshaft, and a fuel injector to maintain torque, in response to the condensate level being determined in the charge air cooler.

13. The method of claim 12, wherein the increasing airflow to the engine is responsive to the condensate level being determined in the charge air cooler being greater than a threshold condensate level and an initial airflow to the engine being within a threshold of a blow-off airflow level, where the initial airflow is a level of the airflow to the engine before increasing the airflow and where the engine torque is not increased greater than a requested torque during the increasing airflow to the engine.

14. The method of claim 12, wherein the increasing engine airflow includes controlling the intake throttle valve disposed in an intake passage upstream of cylinders of the engine to increase an amount of opening of the intake throttle valve, wherein the charge air cooler is disposed in the intake passage, and wherein the electronic controller receives a pedal position signal from a pedal position sensor coupled to an accelerator pedal coupled to the vehicle, where the pedal position signal indicates a requested level of airflow to the engine to produce a torque demand.

15. The method of claim 12, wherein the condensate level is determined by the electronic controller based on a plurality of signals received at the electronic controller from sensors coupled to the engine, where the plurality of signals include each of mass air flow, ambient temperature, charge air cooler outlet temperature, charge air cooler pressure, ambient pressure, and an EGR amount and wherein the adjusting the at least one actuator coupled to the engine to maintain torque is performed by the electronic controller and includes:
   increasing a load applied to the engine via the alternator,
   increasing the spark retard timing of the spark plug,
   increasing the retard variable camshaft timing of the camshaft, and
   enleaning an exhaust air-to-fuel ratio from stoichiometry via the fuel injector.

16. The method of claim 15, wherein the condensate level being determined by the electronic controller is further based on input received at the electronic controller from a humidity sensor coupled to the engine.

17. The method of claim 12, wherein the condensate level being determined by the electronic controller is based on signals received at the electronic controller from sensors coupled to the engine, where the signals include a charge air cooler outlet temperature and at least one of a charge air cooler pressure to ambient pressure ratio and engine load.

18. An engine system, comprising:
   an engine including an intake manifold;
   a compressor coupled to the intake manifold upstream of an intake throttle;
   a charge air cooler coupled downstream of the compressor;
   an accelerator pedal for receiving an operator torque request; and
   an electronic controller including a non-transitory computer readable medium encoded with instructions of:
      maintaining an accelerator pedal position of the accelerator pedal,
      determining an amount of condensate stored in the charge air cooler; and
      increasing an opening of the intake throttle to increase air flow to the intake manifold in response to the amount of condensate having determined and stored in the charge air cooler being higher than a threshold while maintaining an engine torque being depended upon the maintaining an accelerator pedal position of the accelerator pedal.

19. The system of claim 18, wherein the maintaining the engine torque includes at least one of retarding spark ignition timing, adjusting a variable camshaft timing, increasing an alternator load applied on the engine, and enleaning an exhaust air-to-fuel ratio from stoichiometry.

20. The system of claim 19, wherein the increasing air flow includes increasing the air flow from an initial setting to a blow-off airflow setting, the blow-off airflow setting based on the amount of condensate stored at the charge air cooler having been determined.

\* \* \* \* \*